United States Patent
Mahler et al.

(10) Patent No.: US 12,513,660 B2
(45) Date of Patent: Dec. 30, 2025

(54) TECHNIQUES FOR BUILDING DIGITAL TWINS OF CELLULAR NETWORKS AND FOR NAVIGATING THEREWITH

(71) Applicant: THE JOAN AND IRWIN JACOBS TECHNION-CORNELL INSTITUTE, New York, NY (US)

(72) Inventors: Kim Mahler, New York, NY (US); Stephan Jaeckel, Berlin (DE)

(73) Assignee: THE JOAN AND IRWIN JACOBS TECHNION-CORNELL INSTITUTE, New York, NY (US)

( * ) Notice: Subject to any disclaimer, the term of this patent is extended or adjusted under 35 U.S.C. 154(b) by 372 days.

(21) Appl. No.: 18/317,460

(22) Filed: May 15, 2023

(65) Prior Publication Data

US 2023/0370998 A1    Nov. 16, 2023

Related U.S. Application Data

(60) Provisional application No. 63/364,730, filed on May 16, 2022.

(51) Int. Cl.
| | |
|---|---|
| *H04W 16/28* | (2009.01) |
| *G01C 21/20* | (2006.01) |
| *H04W 64/00* | (2009.01) |

(52) U.S. Cl.
CPC .......... *H04W 64/006* (2013.01); *G01C 21/20* (2013.01); *H04W 16/28* (2013.01)

(58) Field of Classification Search
CPC ..... H04W 64/006; H04W 16/28; G01C 21/20
See application file for complete search history.

(56) References Cited

U.S. PATENT DOCUMENTS

| | | |
|---|---|---|
| 9,392,423 B2 | 7/2016 | Bellovin |
| 11,072,356 B2 | 7/2021 | Mong et al. |
| (Continued) | | |

FOREIGN PATENT DOCUMENTS

| | | |
|---|---|---|
| CN | 113852994 A | 12/2021 |
| EP | 3696622 A1 | 8/2020 |
| (Continued) | | |

OTHER PUBLICATIONS

International Search Report for PCT/IB2023/054992, dated Aug. 7, 2023. International Searching Authority, Israel Patent Office, Jerusalem, Israel.

(Continued)

*Primary Examiner* — Kenneth T Lam
(74) *Attorney, Agent, or Firm* — M&B IP Analysts, LLC (57) ABSTRACT

Systems and methods for building digital twins and navigating using digital twins. Reference signal and identifier data sent via antennas is obtained. Timing advance parameters for signals sent to the antennas are received. One or more machine learning models are applied to the reference signal data and timing advance parameters. Each machine learning model is trained to output antenna positions, antenna configurations, or both, and may be trained using training antenna configurations in the form of reference models representing different potential antenna configurations. Based on the outputs of the machine learning models, potential interference for devices occupying various locations within the network are determined. Navigation decisions, gaps in network coverage, or both, are determined based on the potential interference. As a result, interference by one or more devices moving within the network is reduced, thereby improving signal quality.

17 Claims, 7 Drawing Sheets

(56) References Cited

U.S. PATENT DOCUMENTS

| | | |
|---|---|---|
| 11,208,129 B2 | 12/2021 | Kumar et al. |
| 11,468,215 B2 | 10/2022 | Shiraishi et al. |
| 11,493,908 B2 | 11/2022 | Yates et al. |
| 11,509,589 B2 | 11/2022 | Jana et al. |
| 2018/0227040 A1* | 8/2018 | Hudson ................ G05D 1/0022 |
| 2018/0292844 A1* | 10/2018 | Kosseifi ................ G08G 5/26 |
| 2018/0294871 A1* | 10/2018 | Kosseifi ................ H01Q 1/526 |
| 2019/0277635 A1* | 9/2019 | Weisbrod ............ H04B 17/3913 |
| 2019/0322299 A1 | 10/2019 | Mong et al. |
| 2020/0266903 A1* | 8/2020 | De Rosa ............ H04B 7/18506 |
| 2020/0394928 A1* | 12/2020 | Neubauer ............ H04W 36/328 |
| 2021/0345134 A1 | 11/2021 | Ottersten et al. |
| 2021/0357422 A1 | 11/2021 | Cella et al. |
| 2022/0014963 A1 | 1/2022 | Yeh et al. |
| 2022/0051184 A1 | 2/2022 | Cella et al. |
| 2022/0187847 A1 | 6/2022 | Cella et al. |
| 2022/0187852 A1* | 6/2022 | Vandikas ............... H04W 72/12 |
| 2022/0209874 A1 | 6/2022 | Svennebring et al. |
| 2022/0390964 A1* | 12/2022 | Youmans ............. G05D 1/0027 |
| 2022/0399936 A1* | 12/2022 | Arksey ................ H04W 28/24 |
| 2023/0284078 A1* | 9/2023 | Pateromichelakis ........................ H04W 28/0268 370/235 |
| 2024/0089751 A1* | 3/2024 | Kumar ............... H04W 28/0242 |
| 2024/0349236 A1* | 10/2024 | Wang ................ H04W 28/0236 |
| 2024/0414558 A1* | 12/2024 | Haustein ............... H04L 41/145 |
| 2025/0191475 A1* | 6/2025 | Kiles .................... G06Q 10/047 |
| 2025/0193085 A1* | 6/2025 | Das ...................... H04W 24/06 |

FOREIGN PATENT DOCUMENTS

| | | |
|---|---|---|
| EP | 3669497 B1 | 2/2021 |
| EP | 3788769 A1 | 3/2021 |
| EP | 3995981 A | 5/2022 |
| EP | 4055551 A1 | 9/2022 |
| EP | 4104104 A1 | 12/2022 |
| EP | 4119984 A1 | 1/2023 |
| EP | 4143705 A1 | 3/2023 |
| EP | 4159621 A2 | 4/2023 |
| EP | 4199450 A1 | 6/2023 |
| EP | 4264518 A1 | 10/2023 |
| WO | 2016139604 A1 | 9/2016 |

OTHER PUBLICATIONS

Lv Z, Chen D, Feng H, Lou R, Wang H. Beyond 5G for digital twins of UAVs. Computer Networks. Oct. 9, 2021;197:108366. Lv, Zhihan, et a Oct. 9, 2021 (Oct. 9, 2021).

NVIDIA. Ericsson's 5G Digital Twin Simulated in NVIDIA Omniverse. YouTube (online) (video). NVIDIA (retrieved on Jan. 31, 2022, Retrieved from https://www.youtube.com/watch?v=yTbUSXJ8M-8&t=62s NVIDIA Jan. 31, 2022. Dated Aug. 7, 2023.

Written Opinion of the Searching Authority for PCT/IB2023/054992, dated Aug. 7, 2023. International Searching Authority, Israel Patent Office, Jerusalem, Israel.

* cited by examiner

TECHNIQUES FOR BUILDING DIGITAL TWINS OF CELLULAR NETWORKS AND FOR NAVIGATING THEREWITH

CROSS-REFERENCE TO RELATED APPLICATIONS

This application claims the benefit of U.S. Provisional Patent Application No. 63/364,730 filed on May 16, 2022, the contents of which are hereby incorporated by reference.

TECHNICAL FIELD

The present disclosure relates generally to navigation of vehicles requiring communications with networks, and more specifically to building digital twins for cellular networks and navigating using digital twins of cellular networks.

BACKGROUND

As use of unmanned vehicles and vehicle navigation support systems continues to increase, so too does the need for improving automated or semi-automated navigation of vehicles. In particular, unmanned aerial vehicles, commonly referred to as drones, lack a human pilot and therefore often rely on communications with remote operators in order to navigate. As a result, drones and other unmanned vehicles must connect to networks and maintain those network connections. If a connection is lost when important navigation instructions would be received, then the drone may fail to navigate properly, which could result in harm to the drone, its surroundings, or nearby people. Thus, connection reliability is safety-critical for such implementations.

In many applications of drones, the drones are equipped with network interfaces in order to allow them to communicate with a cellular network. A cellular network is a communication network in which the link to and from each end node is wireless. The cellular network is distributed over land areas referred to as cells, with one or more transceivers deployed in each cell. The transceivers in each cell provide network coverage to the cell, which in turn allows for transmitting data to and from systems within the cell. The cells collectively provide network coverage over a broader geographic area. Using cellular networks with multiple transceivers in respective cells may offer several advantages over a single large transmitter such as requiring less power by vehicles communicating with the transceivers and providing a larger area of coverage than a single transceiver.

Although multiple transceiver networks provide advantages over single transceiver networks, navigation systems using cellular networks face new challenges as compared to using a single large transceiver. In particular, signal quality may vary at different points in navigation, i.e., as the vehicle navigates away from one cell and toward another, or even within a cell.

Techniques for cellular handover (also referred to as cellular handoff) attempt to provide connection stability and reliability, seeking to ensure that a connection is maintained as a vehicle moves away from one cell and toward others. Although the general concept of cellular handover is straightforward, cellular handover techniques are typically not simple or easy to implement and therefore present a significant challenge to users and providers of cellular networks.

While this challenge is relatively easy to address for ground-navigating vehicles because the closest transceivers normally provide optimal connectivity for ground-navigating vehicles, optimal connectivity for aerial vehicles is usually not as straightforward. In other words, the optimal transceivers at any given point in navigation may be different for a ground vehicle at coordinates (X, Y, 0), i.e., ground, then for an aerial vehicle at coordinates (X, Y, Z) navigating within the same cells. This challenge is at least partially caused by differences in signal strength for different lobes relative to the transceivers.

In antenna engineering, lobes are local maxima of radiation patterns radiating from an antenna or other radiation source. The radiation pattern of many antennas features a pattern of lobes at various angles and directions. Each lobe includes an area in which the signal strength reaches a peak. The lobes of an antenna typically include a main lobe that has the highest power among lobes as well as several side lobes featuring local maxima that do not have as high power as the main lobe. Consequently, side lobes can also be characterized as energy that "leaks out" from an acoustic beam. An example illustration of this phenomenon is depicted in FIG. 1.

Figure 1:
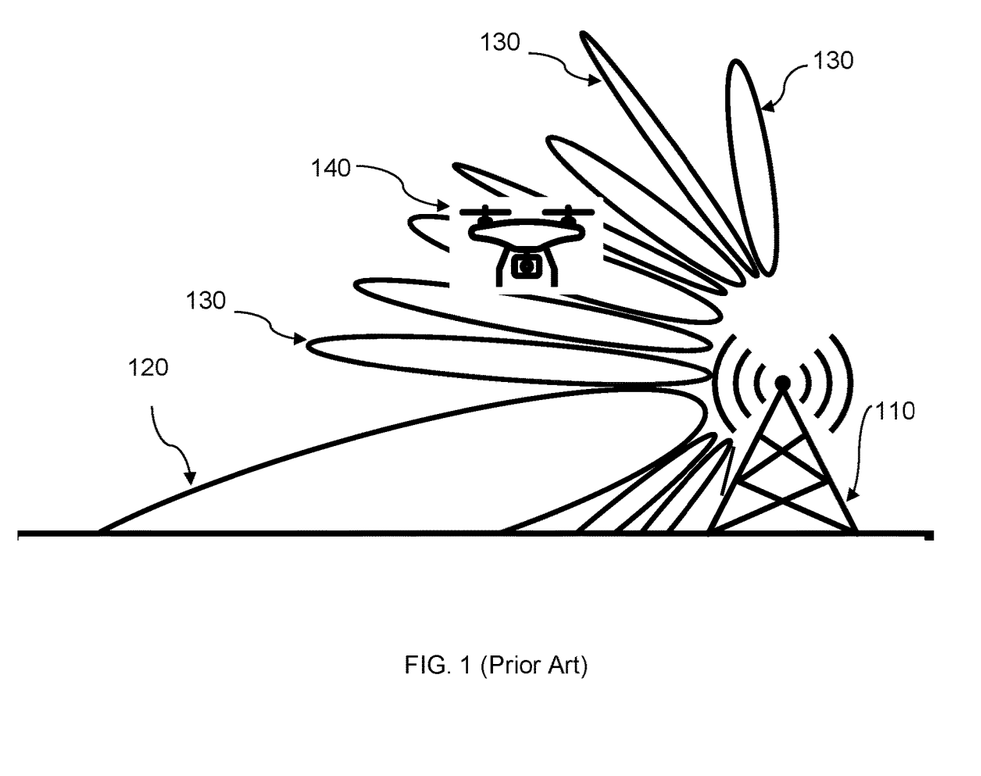
FIG. 1 is a lobe visibility diagram.

FIG. 1 is a lobe visibility diagram 100 illustrating an example set of lobes caused by a transceiver having a particular configuration. The lobe visibility diagram illustrates a transceiver 110 from which a main lobe 120 and various side lobes 130 radiate. As depicted in FIG. 1, a drone 140 navigating in an airspace around the transceiver 110 may occupy one or more of the side lobes 130 at different points in navigation near the transceiver 110 instead of the main lobe 120. Determining which side lobe 130 offers the best signal as well as determining which transceiver (i.e., either the transceiver 110 or a different transceiver) would offer the best signal to the drone 140 at any given point in navigation is a non-trivial challenge.

In addition to general signal strength that varies between side lobes, the signal strength of signals received by a drone can vary depending on other factors like the angle and direction of the lobe. Moreover, excessive side lobe radiation (e.g., as caused when many side lobes are present) or main lobe radiation (e.g., when the cell is far away from the drone) may cause interference that can further reduce signal strength. As signal strength ebbs and flows, some signals may be lost or delayed in receipt by a drone which, for the reasons noted above, could result in harm to people or damage to the drone and its environment. In rural areas, the main lobe is often at a zero degree horizontal angle in order to maximize the coverage area, while in urban areas the first null (i.e., the first minima above the main lobe) is disposed at zero degrees. As a result, flying at cell tower antenna altitude results in maximizing receive power when in rural areas but results in no signals being received in urban areas.

The result of the above variations in signal strength from side lobes is that many attempts at large-scale drone adoption are hindered by loss of connectivity as signals lose strength during navigation. As a result, it would be desirable to provide solutions for maintaining connectivity despite changes in signal intensities as drones navigate within cellular networks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for optimizing navigation using digital twins. The method comprises: determining an interference value for each of a plurality of locations within a network based on a digital twin of the network, wherein the digital twin is a model of the network including a mapping of a plurality of antennas of the network and a plurality of respective antenna configurations for the plurality of antennas; and optimizing at least a portion of network communications within the network based on the determined interference value for each of the plurality of locations within the network.

Certain embodiments disclosed herein also include a non-transitory computer readable medium having stored thereon causing a processing circuitry to execute a process, the process comprising: determining an interference value for each of a plurality of locations within a network based on a digital twin of the network, wherein the digital twin is a model of the network including a mapping of a plurality of antennas of the network and a plurality of respective antenna configurations for the plurality of antennas; and optimizing at least a portion of network communications within the network based on the determined interference value for each of the plurality of locations within the network.

Certain embodiments disclosed herein also include a system for optimizing navigation using digital twins. The system comprises: a processing circuitry; and a memory, the memory containing instructions that, when executed by the processing circuitry, configure the system to: determine an interference value for each of a plurality of locations within a network based on a digital twin of the network, wherein the digital twin is a model of the network including a mapping of a plurality of antennas of the network and a plurality of respective antenna configurations for the plurality of antennas; and optimize at least a portion of network communications within the network based on the determined interference value for each of the plurality of locations within the network.

Certain embodiments disclosed herein include the method, non-transitory computer readable medium, or system noted above, further including or being configured to perform the following steps: determining at least one navigation decision based on the determined interference value for each of the plurality of locations within the network; and causing a device navigating within the network to act according to the at least one navigation decision.

Certain embodiments disclosed herein include the method, non-transitory computer readable medium, or system noted above, further including or being configured to perform the following steps: determining an optimal navigation route for the device navigating within the network, wherein the at least one navigation decision is determined based on the optimal navigation route.

Certain embodiments disclosed herein include the method, non-transitory computer readable medium, or system noted above, further including or being configured to perform the following steps: identifying at least one gap in coverage for the network based on the determined interference value for each of the plurality of locations within the network, wherein each gap in coverage is a location within the network having an interference value above a threshold, wherein the network communications are optimized based on the at least one gap in coverage.

Certain embodiments disclosed herein include the method, non-transitory computer readable medium, or system noted above, further including or being configured to perform the following steps: modifying a configuration of at least one of the plurality of antennas based on the at least one gap in coverage.

Certain embodiments disclosed herein include the method, non-transitory computer readable medium, or system noted above, further including or being configured to perform the following steps: selecting at least one optimal base station for a device navigating within the network based on the determined interference value for each of the plurality of locations within the network, wherein the at least one optimal base station is selected to maximize stability of signal strength for communications with the device; and utilizing the selected at least one optimal base station to send signals to the device.

Certain embodiments disclosed herein include the method, non-transitory computer readable medium, or system noted above, further including or being configured to perform the following steps: building the digital twin by applying at least one machine learning model to inputs of the network including reference signal strength values and timing and frequency synchronization parameters, wherein the at least one machine learning model is trained to output at least a position and a configuration of each antenna in the network.

Certain embodiments disclosed herein include the method, non-transitory computer readable medium, or system noted above, wherein the at least one machine learning model is trained using a training set including a plurality of labels corresponding to respective training reference signal values and training timing and frequency synchronization parameters, the plurality of labels including labels indicating a plurality of antenna configurations and labels indicating a plurality of antenna positions.

Certain embodiments disclosed herein include the method, non-transitory computer readable medium, or system noted above, further including or being configured to perform the following steps: determining a plurality of shapes of radiation patterns within the network based on outputs of the at least one machine learning model; and identifying a position of at least one antenna of the plurality of antennas based on at least one intersection between shapes of the plurality of shapes, wherein the mapping is based on the position of the at least one antenna.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for building digital twins of cellular networks and for navigating using digital twins of cellular networks. Using reference signals sent by base stations including antennas as well as timing and frequency synchronization (TFS) parameters for signals sent between antennas and devices within a network, a digital twin of the network is created. More specifically, configurations of antennas used by transceivers operating as well as locations of antennas within the network may be determined using machine learning, and the antenna configurations are mapped to the network with respect to the locations of their respective antennas in order to create a digital twin of the network. Each transceiver is deployed in a respective cell of the network, where each cell is a geographic area which is a subdivision of a broader geographic area.

Using the digital twin, potential interference (e.g., intercell interference) for a vehicle moving within the network may be determined for various locations within the network. Based on the determined potential interference within the network, an optimal route for minimizing interference is determined. The optimal route includes multiple points representing respective locations within the network, and is determined such that the points of the optimal route individually or in combination minimize the amount of interference affecting the vehicle as compared to other points or combinations of points. A vehicle such as a drone navigates within the network via the optimal route.

The disclosed embodiments provide techniques for determining antenna configurations using inputs from both transceivers including those antennas and reference signal data from vehicles operating within the network. In particular, various disclosed embodiments include techniques for determining these configurations using machine learning. Further, the disclosed embodiments allow for predicting potential interference at different locations within the network by modeling the network as a digital twin and, in particular, by mapping the transceivers and respective antenna configuration information. By predicting interference at various points in the network, a route that minimizes interference can be accurately determined and utilized for navigation, thereby improving signal quality as the vehicle navigates within the network.

In this regard, it has been identified that lobes of antennas (e.g., the lobes 120 and 130, FIG. 1) follow patterns with respect to lobe shape which can be learned and leveraged in order to accurately identify configurations of antennas (e.g., as defined with respect to pattern shape, orientation, or both) and locations of transceivers including those antennas. More specifically, radiation patterns may be indicative of antenna orientation with respect to aspects such as bearing, bank, and tilt angle. Further, since lobes follow repeatable patterns with respect to lobe shape, it has been identified that the potential interference at a given point within the network can be predicted using locations of transceivers and antenna configuration information. Additionally, base stations having transceivers constantly transmit reference signals which can be used to determine signal strength from different transceivers, particularly when combined with knowledge of lobe patterns and the effects those lobe shapes have on signal strength.

Accordingly, the disclosed embodiments utilize machine learning models trained based on configurations of antennas having varying lobe configurations, thereby allowing for predicting interference in order to optimize navigation decisions. The disclosed embodiments allow for leveraging machine learning to learn patterns of lobe radiation (which affects signal quality and interference), which in turn allows for determining antenna configuration information such as position and orientation that can be used to predict interference. Using machine learning further allows for refining interference predictions through machine based on additional factors such as time of day, traffic, and the like.

In addition to improving navigation decisions, the digital twins created in accordance with various disclosed embodiments may allow for improving cellular network coverage. More specifically, by determining potential interference at different locations as described herein, locations which are consequently lacking in coverage may be identified as gaps in coverage. The configurations, locations, or both, of transceivers within the network may be modified in order to improve coverage in any identified gaps.

Additionally, the disclosed embodiments may improve handover by reducing the number of handovers, improving signal quality before and after handovers, or both. Specifically, information about the positions and configurations of antennas within the network may be used for navigation decisions in order to minimize signal loss during handovers. Also, network coverage gaps which may contribute to loss of signal quality during handovers may be identified and corrected as discussed herein.

The techniques described herein allow for enhancing connection reliability, particularly for beyond visual line of sight (BVLOS) operations using drones. The disclosed techniques can be utilized with various generations of networks (e.g., 2G, 3G, 4G, 5G, etc.) while delivering improved connection reliability. The disclosed embodiments therefore allow for improvements related to connection reliability such as, but not limited to, minimizing ping-pong handover, reducing radio link failures, and minimizing connection losses.

Figure 2:
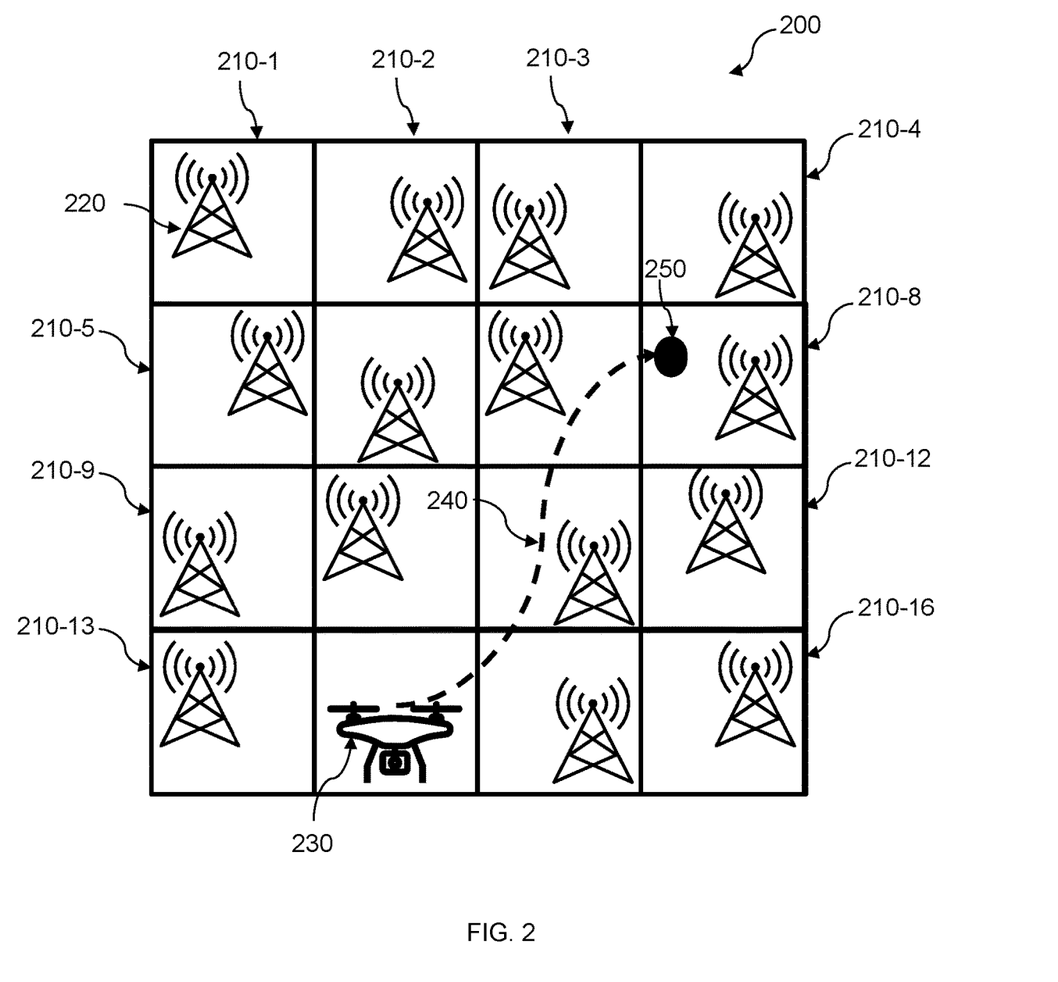
FIG. 2 is a cellular network diagram utilized to describe various disclosed embodiments.

FIG. 2 is an example cellular network diagram 200 utilized to describe various disclosed embodiments.

As depicted in FIG. 2, a cellular network includes multiple cells 210-1 through 210-16 (when a specific cell is not being referenced, hereinafter referred to as cells 210 or as a cell 210), each cell having a respective transceiver 220 deployed therein. In the cellular network diagram network diagram 200, a drone 230 navigates among the cells 210.

In accordance with various disclosed embodiments, an optimal route for navigation such as the navigation path 240 within the cells 210 is determined for the drone 230. The expected navigation path 240 may be determined so as to cause the drone 230 to navigate to a destination point 250.

Each transceiver 220 includes one or more antennas (not shown). Each antenna has a respective configuration which may include, but is not limited to, a position and orientation of the antenna. As described herein, the antenna configuration information for antennas at different locations within the cellular network depicted in FIG. 2 can be utilized in order to predict interference at different locations within the cellular network and, accordingly, to determine optimal routes for vehicles such as the drone 230 in order to minimize or otherwise reduce interference as the vehicles move within the cellular network.

In accordance with various disclosed embodiments, a digital twin (not shown) that is a model of the cellular network is constructed. The digital twin stores a mapping of each of the transceivers 220, of each of the antennas in each transceiver, or both, and may store antenna configuration information for each antenna in the mapping (e.g., such that a mapping entry for a given antenna stores the antenna configuration information for that antenna). Once created, the digital twin may be accessed in order to retrieve antenna configuration information to be utilized for determining potential interference at locations within the cellular network.

It should be noted that a single transceiver 220 is depicted in each cell 210 merely for simplicity purposes, and that multiple transceivers 220 may be deployed in any given cell without departing from the scope of the disclosure. It should also be noted that the navigation path 240 is depicted in only two dimensions merely for simplicity and for use in explaining an example cellular environment in which the disclosed embodiments can be utilized, but that the disclosed embodiments include navigation paths along three-dimensional routes include changes in 3 different axes of movement.

Figure 3:
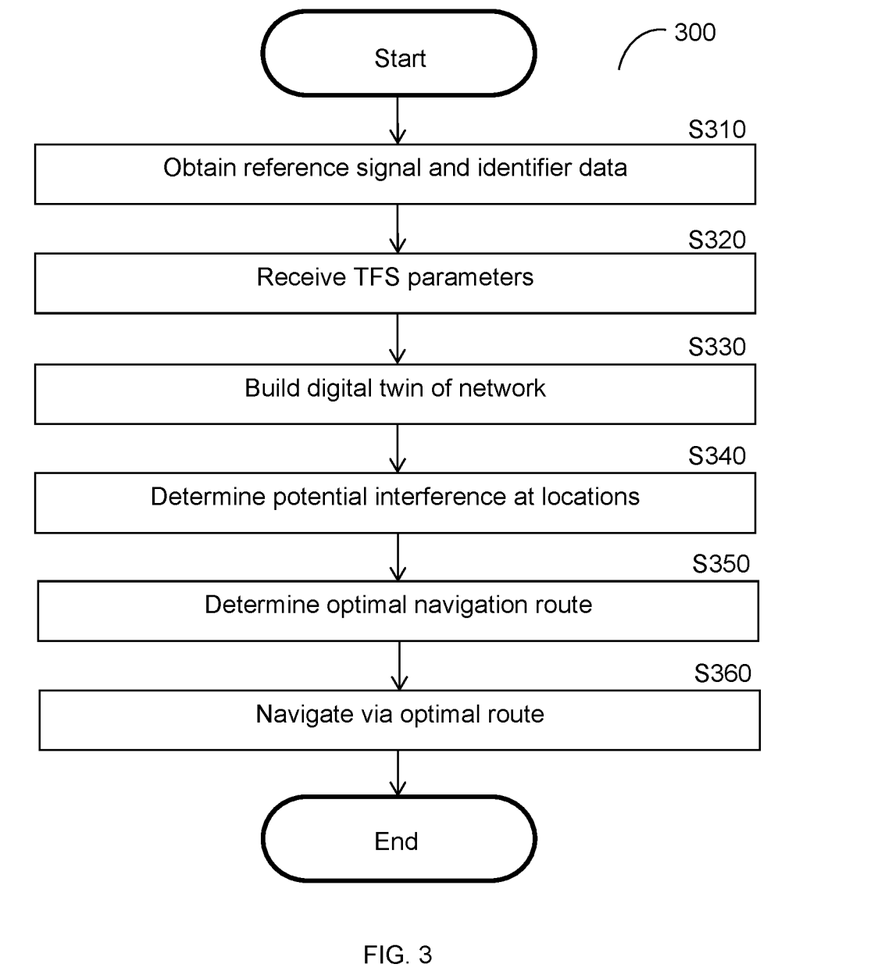
FIG. 3 is a flowchart illustrating a method for navigating in cellular networks using digital twins according to an embodiment.

FIG. 3 is an example flowchart 300 illustrating a method for improving connection reliability while navigating in a cellular network using digital twins according to an embodiment. In an embodiment, the method may be performed by a computer system (e.g., the hardware layer 600, FIG. 6) installed on a vehicle (e.g., the drone 230, FIG. 2).

At S310, reference signal and identifier data are obtained. The reference signal and identifier data may be received, for example, from base stations at which transceivers having antennas used to transmit signals within a cellular network are deployed. The reference signal data may include, but is not limited to, reference signal received power (RSRP) values. Alternatively, the reference signal data may include the reference signals themselves. The identifier data may include, but is not limited to, identifiers of cells, base stations, transceivers, or antennas, which can therefore be utilized to identify locations of different antennas for mapping purposes. In embodiments where the reference signals themselves are received, S310 may further include determining RSRP values for the reference signals.

In this regard, it is noted that many base stations such as base stations in long term evolution (LTE) networks constantly transmit reference signals, and that these reference signals can be utilized to determine the strength of a signal from a given base station and from its neighbors (e.g., base stations in adjacent cells or otherwise base stations within a threshold distance of each other). The resulting values for RSRP may depend on factors such as, but not limited to, propagation conditions, power transmitted by base stations sending the reference signals, antenna configurations, and positions of drone relative to antennas. Accordingly, it has been identified that RSRP values or other measures of signal strength for reference signals can be utilized to derive information such as antenna configurations. In particular, machine learning can be leveraged in order to learn patterns in RSRP values that correlate with different antenna configurations, thereby enabling determining antenna configurations using reference signals or values derived from reference signals.

It is also noted that base stations often send identifiers that uniquely identify themselves along with reference signals, and that these identifiers can therefore be utilized to distinguish among base stations initially during mapping. Once mapped, the base stations may be uniquely identified via their respective locations and antenna configuration information.

At S320, timing and frequency synchronization (TFS) parameters are received. The TFS parameters indicate one or more aspects of signal travel between a source (e.g., a drone operating in a network) and a destination (e.g., an antenna deployed in the network) which can be utilized to determine the location of the destination (e.g., a position of the base station within the network). In accordance with various disclosed embodiments, determining this destination position may be utilized to determine the position of a base station including one or more antennas (and, therefore, the positions of the antennas themselves). To this end, the TFS parameters may include, but are not limited to, values indicating the length of time for a signal to reach a destination when sent by a source (e.g., timing advance parameters), values indicating changes in wavelength or frequency of the signal (e.g., Doppler shift), combinations thereof, and the like.

When the TFS parameters include timing advance parameters, the timing advance parameters may include timing advance values corresponding to the length of time a signal takes to reach the destination (e.g., the base station) from a source (e.g., a drone, and the like). The timing advance parameters may be received, for example, from base stations. Using the timing advance parameters and the speed of light, a distance can be determined. As a non-limiting example, for LTE networks, a distance value that is an increment of 78.12 meters can be determined. To this end, in an embodiment, S320 may further include determining such distance values based on the timing advance parameters, and the distance values may be used as an input to the machine learning.

The TFS parameters may include changes in wavelength or frequency when the source (e.g., the drone) is moving at a fixed speed and in a fixed direction. The movement of the source causes a Doppler shift of the carrier frequency for signals transmitted from the source to the destination (e.g., an antenna of a base station). The Doppler shift can be measured. To this end, in some embodiments, S320 may include performing one or more synchronization steps to align a source frequency with a destination frequency in order to determine a frequency offset (e.g., the Doppler shift). In a further embodiment, the reference signals in the reference signal data may be used for a coarse synchronization (e.g., primary synchronization signal), and then a fine synchronization may be performed in order to measure an exact carrier frequency offset (CFO), which may be used as the value for the Doppler shift.

It is noted that base stations often send timing advance parameters. It has been identified that these timing advance parameters can be leveraged for localization in order to determine the position of the device sending the signal to the base station. It has been identified that, given the position of the device (e.g., a drone) and these timing advance parameters, the position of the base station which provided the timing advance parameters can likewise be determined. Like for antenna configurations, machine learning can be utilized to learn patterns in timing advance parameters that can be utilized to identify positions of base stations relative to vehicles such as drones, which in turn can be utilized to identify the positions of base stations.

It is further noted that timing advance parameters often are very low resolution (e.g., 80 meters resolution limit for LTE) and that this low resolution may cause timing advance parameters provide less accurate localization results in at least some implementations. In an embodiment, to improve localization accuracy in spite of these limitations, multiple timing advance measurements may be combined and utilized to perform localization. In a further embodiment, hundreds (e.g., one hundred or more) of timing advance measurements may be combined. More specifically, machine learning may be utilized to effectively allow for combining timing advance measurements in order to improve localization accuracy, for example by training a machine learning model using training sets including multiple timing advance parameter measurements for each base station represented in the training data.

At S330, a digital twin is built for a network. The digital twin is a model of the network including a mapping identifying locations of at least antennas within the network. In accordance with various disclosed embodiments, the digital twin stores antenna configuration and position information for each antenna in the network. The antenna information stored in the digital twin can be utilized in order to determine predicted interference values as discussed below.

Figure 4:
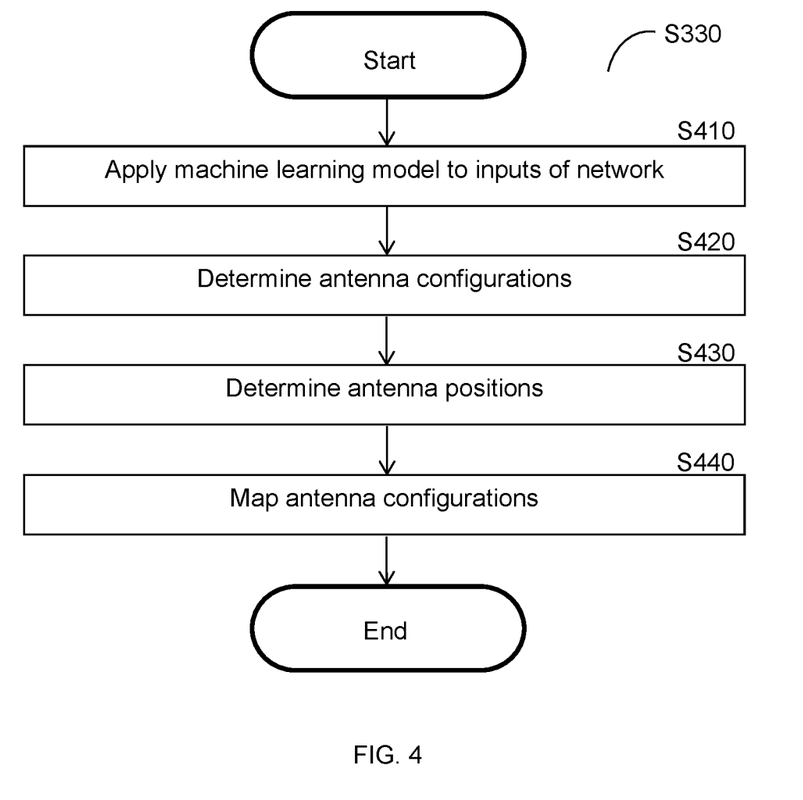
FIG. 4 is a flowchart illustrating a method for building a digital twin of a cellular network according to an embodiment.

In an embodiment, the digital twin is built as now described with respect to FIG. 4. FIG. 4 is a flowchart S330 illustrating a method for building a digital twin of a cellular network according to an embodiment.

At S410, a machine learning model is applied to inputs of the network. In an embodiment, the machine learning model is trained to output at least a position and a configuration of each antenna in the network when applied to inputs including reference signal strength values (e.g., RSRP values) and timing advance parameters. In an embodiment, the configuration of each antenna includes, but is not limited to, an orientation.

In an embodiment, the machine learning model may be trained using a training data set including training vehicle positions, training signal strengths for signals received by vehicles, training timing advance parameters, training antenna positions, and training antenna configurations. In an embodiment, the training antenna configurations include at least positions of antennas and orientations of antennas. In a further embodiment, the training antenna configurations may be realized as equations representing different possible configurations of antennas. Alternatively or in combination, the training antenna configurations may be realized as combinations of values representing respective aspects of antenna configurations (e.g., orientation, type of antenna, number of antennas, arrangements of antennas, etc.).

The antenna positions used for training may be absolute positions defined in a coordinate system (e.g., geographic coordinate) or may be defined with respect to a point of reference such as, but not limited to, a location of a user device which sent signals to or received signals from an antenna at a known position.

The antenna configurations used for training may include known antenna configurations from reference models (e.g., known physical models of antennas) that represent different potential antenna configurations. To this end, the reference models may include combinations of parameters such as, but not limited to, orientations of antennas, numbers of antennas at a given base station, arrangements of multiple antennas at a given base station, combinations thereof, and the like. The reference models may represent, but are not limited to, three-dimensional (3D) models of antennas arranged in a phased array and may include multiple variations of different antenna configurations.

In some embodiments, the machine learning model may be trained using supervised learning using a labeled training data set including the training antenna configurations and the training antenna positions as labels for respective combinations of the training reference signal values and the training timing advance parameters.

In a further embodiment, the training data set used for training the machine learning model may further include training environmental data such as, but not limited to, time of day, traffic (e.g., numbers of devices, drones, etc., in the area at a given time), and the like. The environmental data may be associated with respective times at which reference signal strength values and timing advance parameters are captured or times at which the signals upon which these values and parameters are based were sent. When the model is trained using supervised learning, the supervised training data set may include combinations of antenna configurations and training antenna positions as labels for respective combinations of training reference signal values and training timing advance parameters.

It should be noted that the machine learning of S410 is described with respect to a single machine learning model being applied for both antenna position and antenna configuration, but that the disclosed embodiments are not necessarily limited as such. For example, different machine learning models may be trained to output position and configuration, respectively, based on the same combinations of inputs or different combinations of inputs. Moreover, different machine learning models may be trained to output different respective aspects of configuration (e.g., orientation, radiation pattern shape of radiation emitted from the antenna, type of antenna, arrangements of antennas, numbers of antennas, etc.).

At S420, an antenna configuration is determined for each of the antennas based on outputs of the machine learning model. As noted above, the machine learning model may be trained to output an antenna configuration corresponding to a known antenna configuration (e.g., as represented in a reference model of an antenna or array of antennas). The antenna configuration may be determined as known values of respective parameters for the known antenna configuration.

At S430, an antenna position is determined for each of the antennas based on outputs of the machine learning model. As noted above, the machine learning model may output an absolute position defined with respect to a coordinate system or a relative position defined with respect to a point of reference (e.g., a point at which a device communicating with the antenna is at). When the machine learning model outputs a relative position of the antenna, S430 may include determining the absolute position of the antenna based on the output relative position and a known absolute position of the point of reference.

As noted above, timing and frequency synchronization (TFS) parameters may be utilized in accordance with various embodiments. Such TFS parameters may include, but are not limited to, timing advance parameters, Doppler measurements or other wavelength or frequency measurements, combinations thereof, and the like. In some embodiments, S430 may further include determining shapes of radiation patterns within the network based on such outputs of the machine learning model related to such TFS parameters. In a further embodiment, S430 also includes identifying positions of antennas within the network based on intersections of those shapes of radiation patterns. As noted below, the mapping may be based on these positions of the antennas.

In an embodiment, when the TFS parameters include timing advance parameters, a location of the destination on the surface of a sphere around the drone may be determined using the machine learning outputs for each distance measurement input. Using multiple distance measurements, multiple spheres around the source can be identified, and the intersection of multiple spheres around the same source may be used to identify the position of the destination. In an example implementation, the intersection of 3 spheres in a single location may be identified as the position of a base station, with additional measurements (and therefore additional spheres) further improving the accuracy of the identified position.

In an embodiment, when the TFS parameters include Doppler measurements, a cone of possible directions that cause the same Doppler shift value may be determined using outputs of the machine learning. Using multiple Doppler shift values, multiple cones originating from the source can be identified, and the intersection of multiple cones originating from the same source can be used to identify the position of the destination. In an example implementation, the intersection of 3 cones in a single location may be identified as the position of a base station, with additional measurements (and therefore additional cones) further improving the accuracy of the identified position.

At S440, the antenna configurations are mapped based on the determined antenna positions, thereby creating a map which is a digital twin of the network at least with respect to the antennas of the network. The mapping includes data indicating the determined antenna configurations associated with corresponding positions within the network. In some embodiments, the mapping may be a 3D mapping using 3D reference models to represent antennas or antenna arrays of the same configurations as determined at S420.

Returning to FIG. 3, at S340, potential interference is determined for various locations within the network based on the digital twin. More specifically, the potential interference at a given location may be a predicted interference value for a device (e.g., a drone) occupying the location calculated and is determined based on the antenna configurations and positions of antennas which may be projecting signals within the network. In a further embodiment, the predicted interference values are values for inter-cell interference (i.e., interference between cells).

In some embodiments, S340 may further include applying a machine learning model trained to determine predicted interference values at different locations based on digital twins and one or more additional environmental factors. Such environmental factors may include, but are not limited to, time of day, amount of traffic (e.g., an amount of drones occupying a given area), combinations thereof, and the like.

In this regard, it is noted that signal activity within the network that may affect the amount of interference experienced by a given device within the network can vary depending on these and other environmental factors. It has been identified that machine learning can be leveraged to further improve interference predictions as compared to traditional calculations based solely on antenna configurations and positions relative to devices by accounting for these environmental factors.

At S350, an optimal navigation route is determined based on the potential interference determined for the various locations in the network. The optimal navigation route may include, but is not limited to, multiple points representing respective locations within the network, and is determined such that the points of the optimal route individually or in combination minimize the amount of interference affecting the vehicle as compared to other points or combinations of points.

More specifically, using the predicted interference values determined at S340, locations where more interference would be experienced by the drone may be identified and either avoided entirely or navigated such that the overall interference while moving through multiple locations is minimized (e.g., by reducing the average interference among those locations or reducing the number of locations navigate through at which the interference is above a threshold). The optimal route may be determined such that a vehicle navigating via the optimal route arrives at a destination (e.g., the point 250, FIG. 2).

At S360, navigation is performed via the optimal route. In an embodiment, the navigation includes aerial navigation of a vehicle such as a drone via the optimal route such that interference experienced by a device deployed with the vehicle (e.g., a device installed on a drone) is minimized or otherwise reduced. The navigation may be performed by operating the vehicle (e.g., when the method is performed by a computing system installed on the vehicle) or realized by sending commands to the vehicle (e.g., when the method is performed by a system that is remote from the vehicle).

Figure 5:
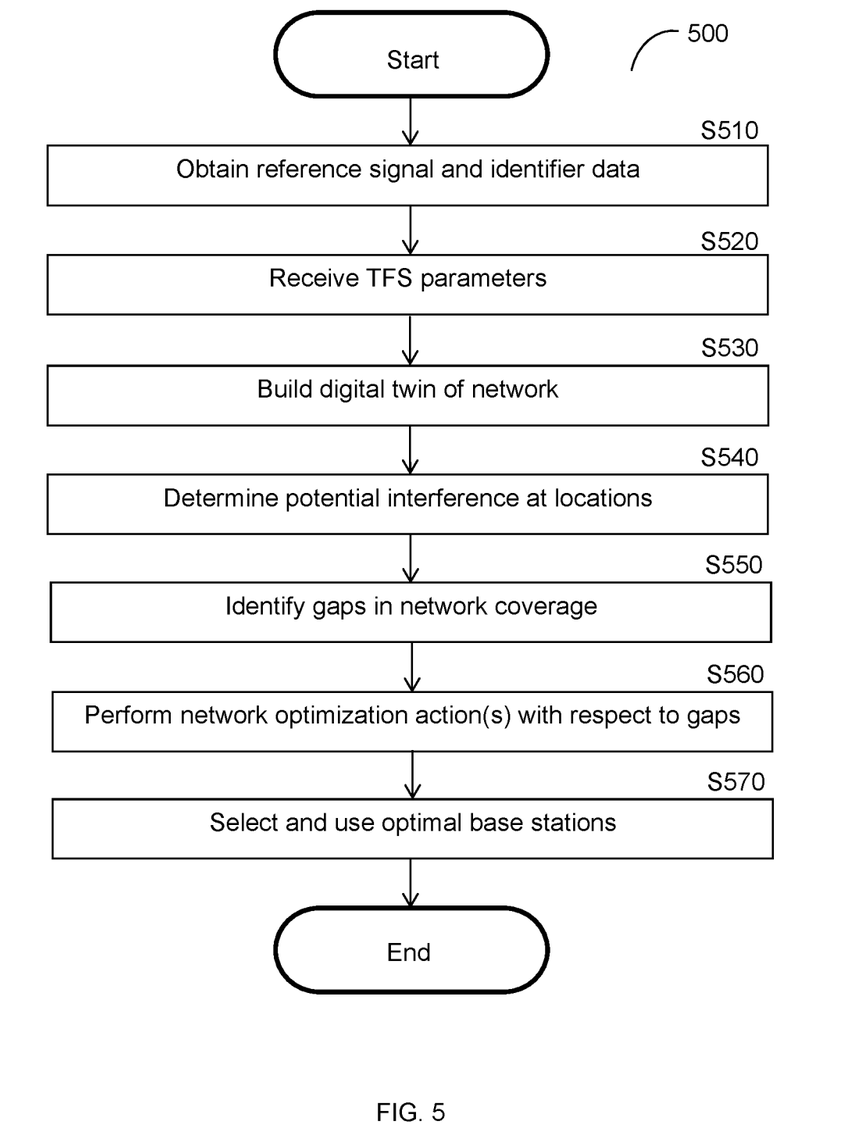
FIG. 5 is a flowchart illustrating a method for identifying network coverage gaps and optimizing network coverage according to an embodiment.

FIG. 5 is a flowchart illustrating a method for identifying network coverage gaps and optimizing network coverage according to an embodiment. In an embodiment, the method is performed by the network coverage optimizer 700, FIG. 7.

At S510, reference signal and identifier data are obtained. The reference signal and identifier data may be received, for example, from base stations at which transceivers having antennas used to transmit signals within a cellular network are deployed. The reference signal data may include, but is not limited to, reference signal received power (RSRP) values. Alternatively, the reference signal data may include the reference signals themselves. The identifier data may include, but is not limited to, identifiers of cells, base stations, transceivers, or antennas, which can therefore be utilized to identify locations of different antennas for mapping purposes. In embodiments where the reference signals themselves are received, S510 may further include determining RSRP values for the reference signals.

At S520, timing and frequency synchronization (TFS) parameters are received. The TFS parameters indicate one or more aspects of signal travel between a source (e.g., a drone operating in a network) and a destination (e.g., an antenna deployed in the network) which can be utilized to determine the location of the destination (e.g., a position of the base station within the network). In accordance with various disclosed embodiments, determining this destination position may be utilized to determine the position of a base station including one or more antennas (and, therefore, the positions of the antennas themselves). To this end, the TFS parameters may include, but are not limited to, values indicating the length of time for a signal to reach a destination when sent by a source (e.g., timing advance parameters), values indicating changes in wavelength or frequency of the signal (e.g., Doppler shift), combinations thereof, and the like.

As noted above with respect to FIG. 3, the timing advance parameters may include timing advance values corresponding to the length of time a signal takes to reach the destination (e.g., the base station) from a source (e.g., a drone, and the like). Likewise as noted above with respect to FIG. 3, the TFS parameters may include changes in wavelength or frequency when the source (e.g., the drone) is moving at a fixed speed and in a fixed direction. To this end, S520 may include performing one or more synchronization steps to align a source frequency with a destination frequency.

At S530, a digital twin is built for a network. The digital twin is a model of the network including a mapping identifying locations of at least antennas within the network. In accordance with various disclosed embodiments, the digital twin stores antenna configuration and position information for each antenna in the network. The antenna information stored in the digital twin can be utilized in order to determine predicted interference values as discussed below. In an embodiment, the digital twin of the network may be built as described above with respect to S330 and FIG. 4.

At S540, potential interference is determined for various locations within the network based on the digital twin. More specifically, the potential interference at a given location may be a predicted interference value for a device (e.g., a drone) occupying the location calculated and is determined based on the antenna configurations and positions of antennas which may be projecting signals within the network. In a further embodiment, the predicted interference values are values for inter-cell interference (i.e., interference between cells).

In some embodiments, S540 may further include applying a machine learning model trained to determine predicted interference values at different locations based on digital twins and one or more additional environmental factors. Such environmental factors may include, but are not limited to, time of day, amount of traffic (e.g., an amount of drones occupying a given area), combinations thereof, and the like.

At S550, based on the potential interference at various locations within the network, gaps in network coverage are identified. The gaps may be identified as, for example, locations at which the predicted interference value is above a threshold. In a further embodiment, the gaps may be identified with respect to potential handover events that may occur within the network.

At S560, one or more network optimization actions are performed with respect to the identified gaps. The network optimization actions may include, but are not limited to, modifying a configuration of one or more antennas, sending a notification requesting such a modification, sending a notification requesting modification of the position of one or more antennas, sending a notification requesting deployment of additional antennas (e.g., to bridge gaps in network coverage), combinations thereof, and the like. As a non-limiting example, a notification may be sent to a user device of an operator of the network, and the operator may proceed to alter antenna configurations in line with the requested modifications.

At optional S570, when a vehicle is navigating or is going to navigate within the network, optimal base stations for sending signals back-and-forth with the vehicle may be selected and used for communications with the vehicle. The optimal base stations may include, but are not limited to, base stations which collectively include a subset of transceivers within the network such that the transceivers in the subset collectively provide the most stable signal strength among potential subsets of transceivers, i.e., such that the selected transceivers maximize stability of signal strength for communications with the vehicle or a device installed thereon. To this end, in an embodiment, the optimal base stations are selected based at least partially on the potential interference determined at S540.

In a further embodiment, the potential interference values at different locations may be used in a weighting scoring algorithm that accounts for multiple factors such as, but not limited to, availability, continuity, latency, interference, and so on. Example techniques for selecting transceivers to provide the most stable signal strength are described further in U.S. patent application Ser. No. 18/154,579, assigned to the common assignee, the contents of which are hereby incorporated by reference.

Figure 6:
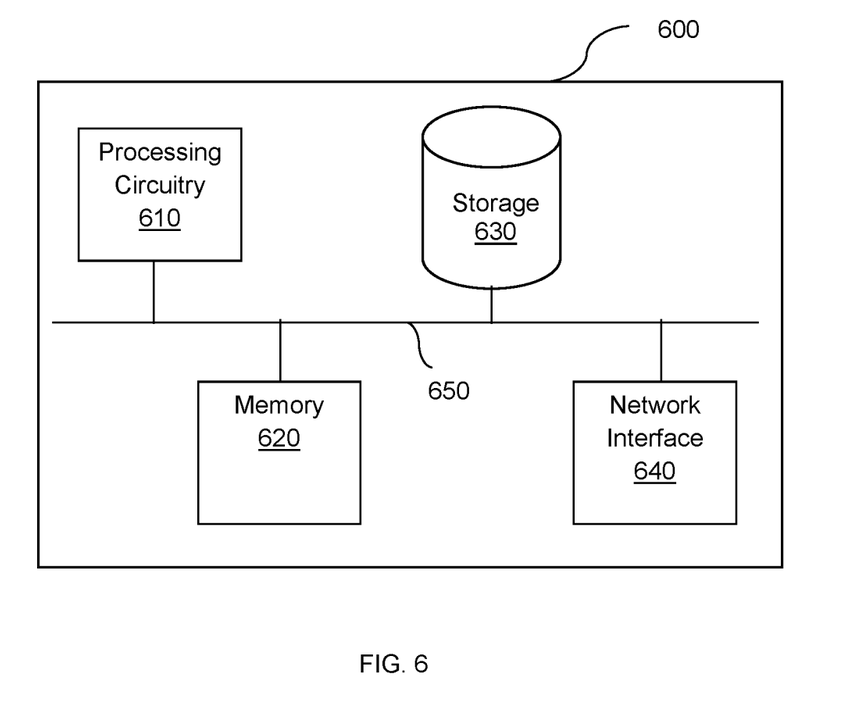
FIG. 6 is a schematic diagram of a computer hardware layer utilized to implement various disclosed embodiments.

FIG. 6 is an example schematic diagram of a computer hardware layer 600 utilized by vehicles in order to implement various disclosed embodiments. The hardware layer 600 includes a processing circuitry 610 coupled to a memory 620, a storage 630, and a network interface 640. In an embodiment, the components of the hardware layer 600 may be communicatively connected via a bus 650. The hardware layer 600 may be installed on a device that will move through a cellular network and requires connections to the cellular network such as, but not limited to, the drone 230, FIG. 2.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows an unmanned aerial vehicle having the hardware layer 600 to communicate with at least transceivers (e.g., the transceiver 110, FIG. 1).

It should be understood that the embodiments described herein are not limited to the specific architecture illustrated in FIG. 6, and other architectures may be equally used without departing from the scope of the disclosed embodiments.

Figure 7:
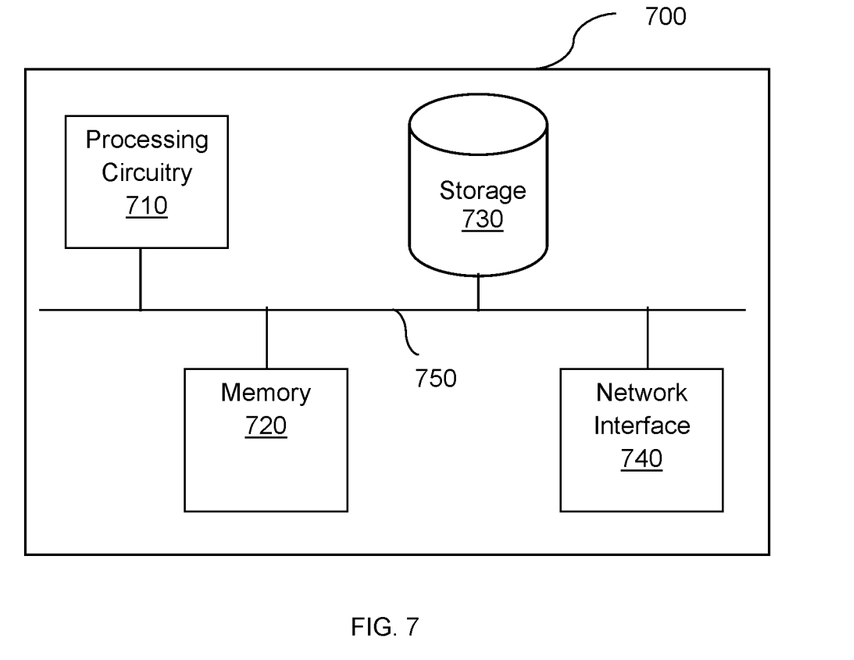
FIG. 7 is a schematic diagram of a network coverage optimizer according to an embodiment.

FIG. 7 is an example schematic diagram of a network coverage optimizer 700 according to an embodiment. The network coverage optimizer 700 includes a processing circuitry 710 coupled to a memory 720, a storage 730, and a network interface 740. In an embodiment, the components of the network coverage optimizer 700 may be communicatively connected via a bus 750. The network coverage optimizer 700 may be configured to identify network coverage gaps and to perform network coverage optimization actions with respect to such gaps as discussed above with respect to FIG. 5.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the network coverage optimizer 700 to communicate with at least transceivers (e.g., the transceiver 110, FIG. 1), vehicles (e.g., the drone 140, FIG. 1), or both, in order to obtain reference signal and timing advance parameter data for use in identifying coverage gaps. The network interface 740 may further allow the network coverage optimizer 700 to send notifications or other messages to user devices (not shown) in order to notify the operators of those user devices about network coverage gaps and potential corrective actions for those gaps.

It should be understood that the embodiments described herein are not limited to the specific architecture illustrated in FIG. 7, and other architectures may be equally used without departing from the scope of the disclosed embodiments.

It should be noted that various disclosed embodiments are discuss with respect to unmanned aerial vehicles, but that the techniques discussed herein may be applicable to other types of vehicles requiring communications with other systems in order to maintain network connections. In particular, other types of aerial vehicles, regardless of whether they are manned or unmanned, may require obtaining signals from external sources, and techniques for improving connection reliability to ensure that navigation continues unimpeded.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for optimizing navigation using digital twins, comprising:
building a digital twin by applying at least one machine learning model to inputs of a network including reference signal strength values and timing and frequency synchronization parameters, wherein the at least one machine learning model is trained to output at least a position and a configuration of each antenna in the network, wherein the digital twin is a model of the network including a mapping of a plurality of antennas of the network and a plurality of respective antenna configurations for the plurality of antennas;

determining an interference value for each of a plurality of locations within the network based on the digital twin of the network; and optimizing at least a portion of network communications within the network based on the determined interference value for each of the plurality of locations within the network.

2. The method of claim 1, wherein optimizing the network communications further comprises:
   determining at least one navigation decision based on the determined interference value for each of the plurality of locations within the network; and
   causing a device navigating within the network to act according to the at least one navigation decision.

3. The method of claim 2, further comprising:
   determining an optimal navigation route for the device navigating within the network, wherein the at least one navigation decision is determined based on the optimal navigation route.

4. The method of claim 1, wherein optimizing the network communications further comprises:
   identifying at least one gap in coverage for the network based on the determined interference value for each of the plurality of locations within the network, wherein each gap in coverage is a location within the network having an interference value above a threshold, wherein the network communications are optimized based on the at least one gap in coverage.

5. The method of claim 4, further comprising:
   modifying a configuration of at least one of the plurality of antennas based on the at least one gap in coverage.

6. The method of claim 4, further comprising:
   selecting at least one optimal base station for a device navigating within the network based on the determined interference value for each of the plurality of locations within the network, wherein the at least one optimal base station is selected to maximize stability of signal strength for communications with the device; and
   utilizing the selected at least one optimal base station to send signals to the device.

7. The method of claim 1, wherein the at least one machine learning model is trained using a training set including a plurality of labels corresponding to respective training reference signal values and training timing and frequency synchronization parameters, the plurality of labels including labels indicating a plurality of antenna configurations and labels indicating a plurality of antenna positions.

8. The method of claim 1, wherein building the digital twin further comprises:
   determining a plurality of shapes of radiation patterns within the network based on outputs of the at least one machine learning model; and
   identifying a position of at least one antenna of the plurality of antennas based on at least one intersection between shapes of the plurality of shapes, wherein the mapping is based on the position of the at least one antenna.

9. A non-transitory computer readable medium having stored thereon instructions for causing a processing circuitry to execute a process, the process comprising:
   building a digital twin by applying at least one machine learning model to inputs of a network including reference signal strength values and timing and frequency synchronization parameters, wherein the at least one machine learning model is trained to output at least a position and a configuration of each antenna in the network, wherein the digital twin is a model of the network including a mapping of a plurality of antennas of the network and a plurality of respective antenna configurations for the plurality of antennas;
   determining an interference value for each of a plurality of locations within the network based on the digital twin of the network; and
   optimizing at least a portion of network communications within the network based on the determined interference value for each of the plurality of locations within the network.

10. A system for optimizing navigation using digital twins, comprising:
    a processing circuitry; and
    a memory, the memory containing instructions that, when executed by the processing circuitry, configure the system to:
    build a digital twin by applying at least one machine learning model to inputs of a network including reference signal strength values and timing and frequency synchronization parameters, wherein the at least one machine learning model is trained to output at least a position and a configuration of each antenna in the network, wherein the digital twin is a model of the network including a mapping of a plurality of antennas of the network and a plurality of respective antenna configurations for the plurality of antennas;
    determine an interference value for each of a plurality of locations within the network based on the digital twin of the network; and
    optimizing at least a portion of network communications within the network based on the determined interference value for each of the plurality of locations within the network.

11. The system of claim 10, wherein the system is further configured to:
    determine at least one navigation decision based on the determined interference value for each of the plurality of locations within the network; and
    cause a device navigating within the network to act according to the at least one navigation decision.

12. The system of claim 11, wherein the system is further configured to:
    determine an optimal navigation route for the device navigating within the network, wherein the at least one navigation decision is determined based on the optimal navigation route.

13. The system of claim 10, wherein the system is further configured to:
    identify at least one gap in coverage for the network based on the determined interference value for each of the plurality of locations within the network, wherein each gap in coverage is a location within the network having an interference value above a threshold, wherein the network communications are optimized based on the at least one gap in coverage.

14. The system of claim 13, wherein the system is further configured to:
    modify a configuration of at least one of the plurality of antennas based on the at least one gap in coverage.

15. The system of claim 13, wherein the system is further configured to:
    select at least one optimal base station for a device navigating within the network based on the determined interference value for each of the plurality of locations within the network, wherein the at least one optimal base station is selected to maximize stability of signal strength for communications with the device; and utilize the selected at least one optimal base station to send signals to the device.

16. The system of claim 10, wherein the at least one machine learning model is trained using a training set including a plurality of labels corresponding to respective training reference signal values and training timing and frequency synchronization parameters, the plurality of labels including labels indicating a plurality of antenna configurations and labels indicating a plurality of antenna positions.

17. The system of claim 10, wherein the system is further configured to:
   determine a plurality of shapes of radiation patterns within the network based on outputs of the at least one machine learning model; and
identify a position of at least one antenna of the plurality of antennas based on at least one intersection between shapes of the plurality of shapes, wherein the mapping is based on the position of the at least one antenna.

\* \* \* \* \*